United States Patent

[11] 3,610,464

| [72] | Inventor | Horton Hampton Loughry<br>Chesterland, Ohio |
|---|---|---|
| [21] | Appl. No. | 834,366 |
| [22] | Filed | June 18, 1969 |
| [45] | Patented | Oct. 5, 1971 |
| [73] | Assignee | Automated Packaging Systems, Inc.<br>Twinsburg, Ohio |

[54] ARTICLE HANDLING APPARATUS WITH AUTOMATIC CONTROLS FOR SUPPLY AND DISPENSER
7 Claims, 9 Drawing Figs.

[52] U.S. Cl. .................................................. 221/10, 221/13
[51] Int. Cl. ...................................................... G07f 11/00
[50] Field of Search ........................................... 221/1, 2, 9, 10, 13; 133/8

[56] References Cited
UNITED STATES PATENTS

| 2,632,588 | 3/1953 | Hoar, Jr. ..................... | 221/13 X |
| 2,750,949 | 6/1956 | Kulo et al. ..................... | 133/8 |
| 3,221,903 | 12/1965 | Von Geen ..................... | 221/9 X |
| 3,416,291 | 12/1968 | Uchida ......................... | 133/8 X |

*Primary Examiner*—Samuel F. Coleman
*Attorney*—Watts, Hoffmann, Fisher & Heinke ABSTRACT: Material-handling apparatus including a feeder unit for feeding articles to an accumulator structure, a counter unit for counting the articles being fed to the accumulator, and a control unit governing operation of the feeder unit and accumulator in response to operation of the counter unit. The control unit permits a batch of articles in the accumulator to be dumped into a container at a packaging station after which the container is sealed by a sealing unit operated by the control unit.

In one embodiment, a plurality of these apparatuses are utilized to separately feed desired numbers of articles to a conveyor. Each apparatus includes feeder, counter and control units and the apparatuses are ganged together so that the conveyor deposits the articles in a common container for packaging.

INVENTOR.
H. HAMPTON LOUGHRY
BY Watts, Hoffmann,
Fisher & Heinke
ATTORNEYS

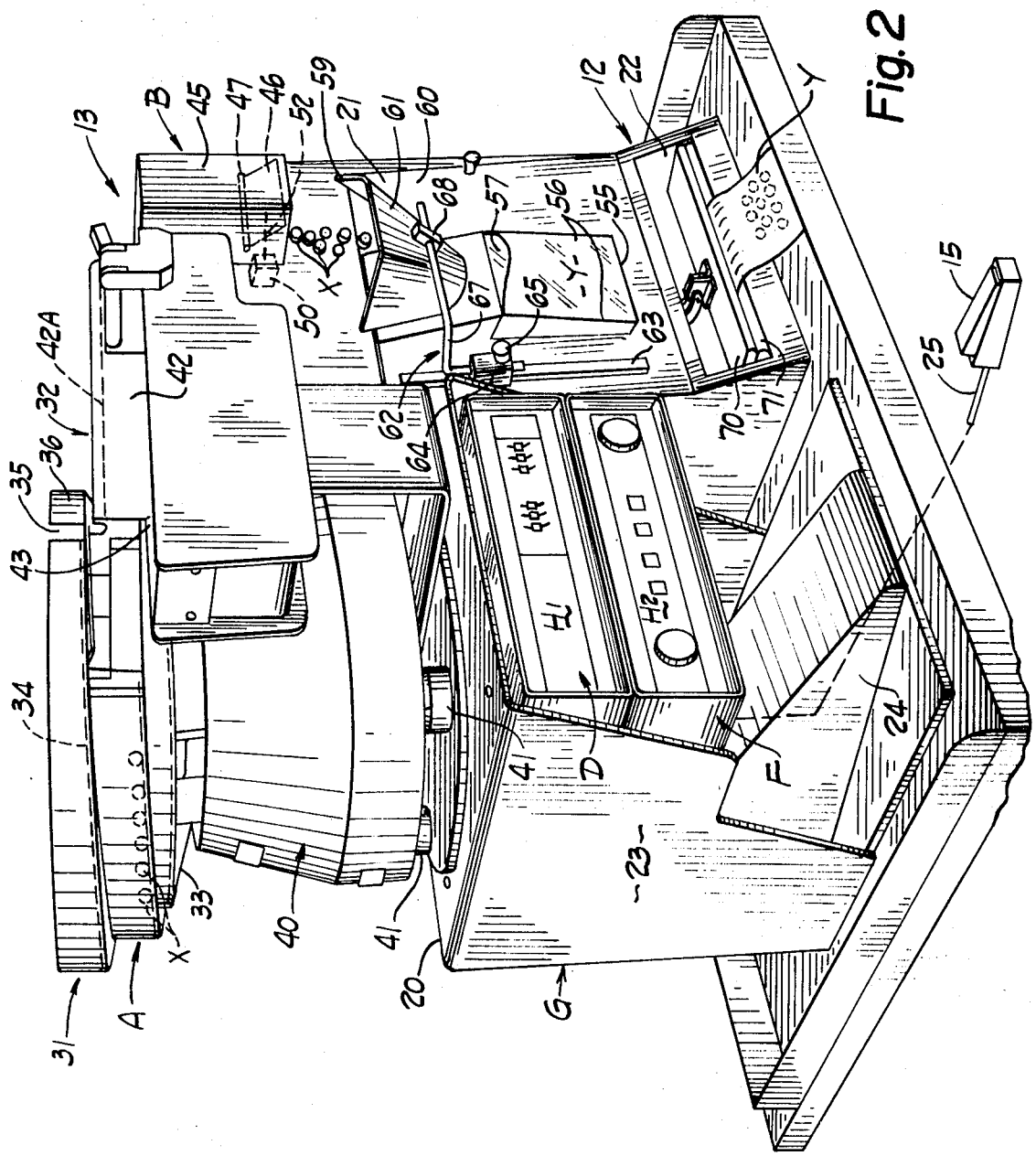

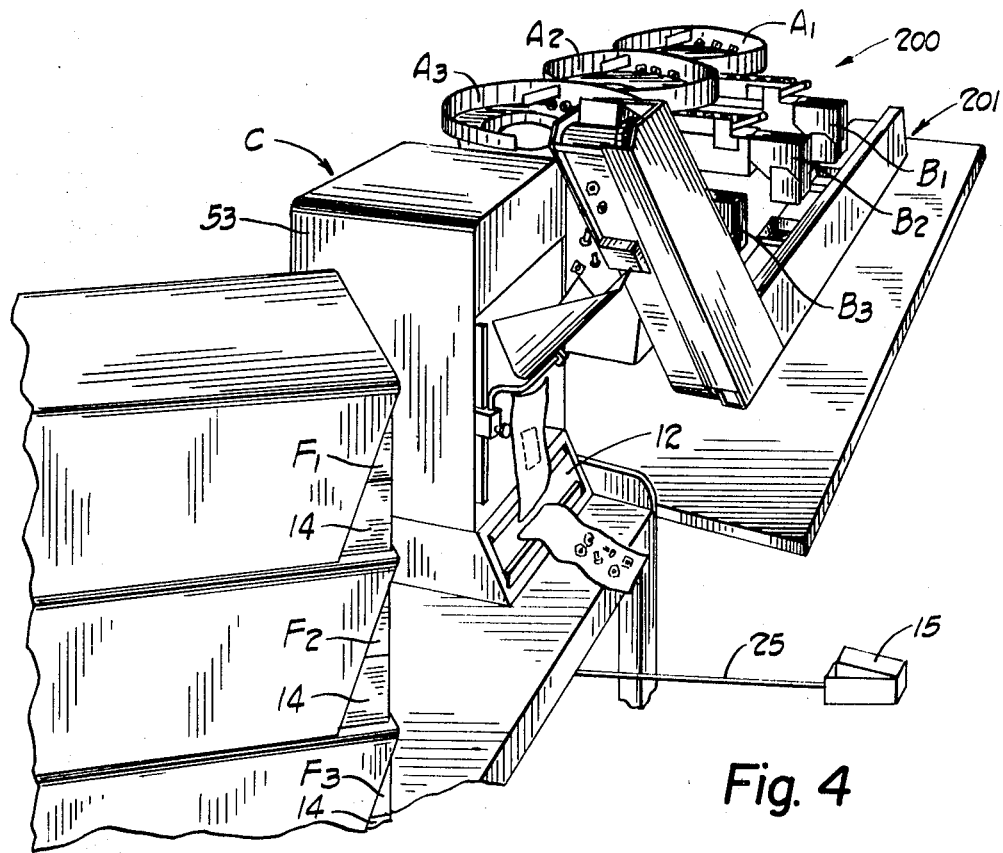
Fig. 4
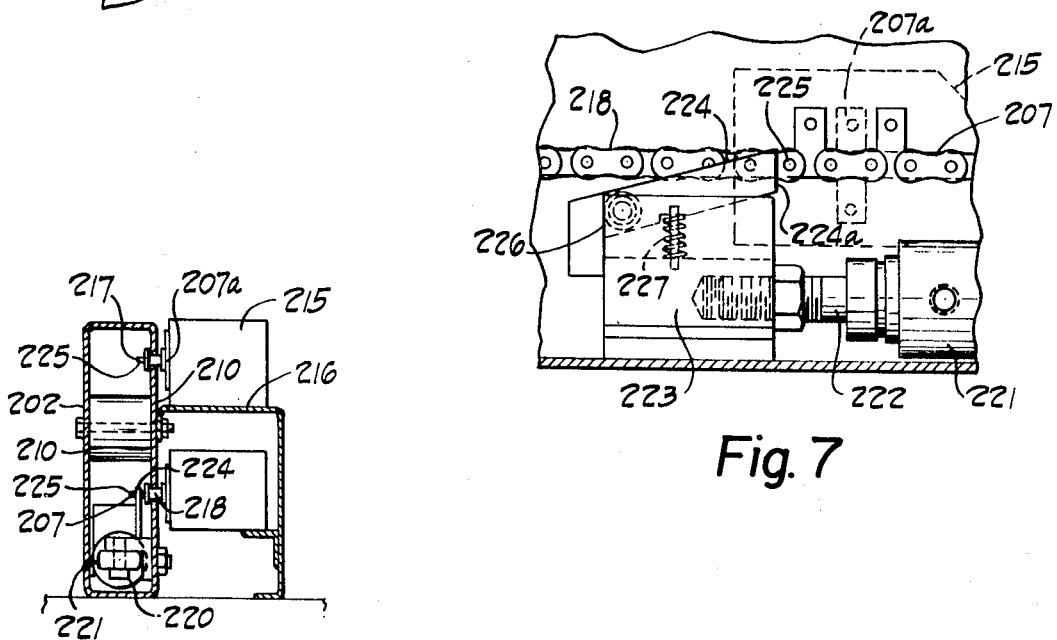
Fig. 7
Fig. 6
INVENTOR.
H. HAMPTON LOUGHRY
BY Watts, Hoffmann,
Fisher & Heinke
ATTORNEYS

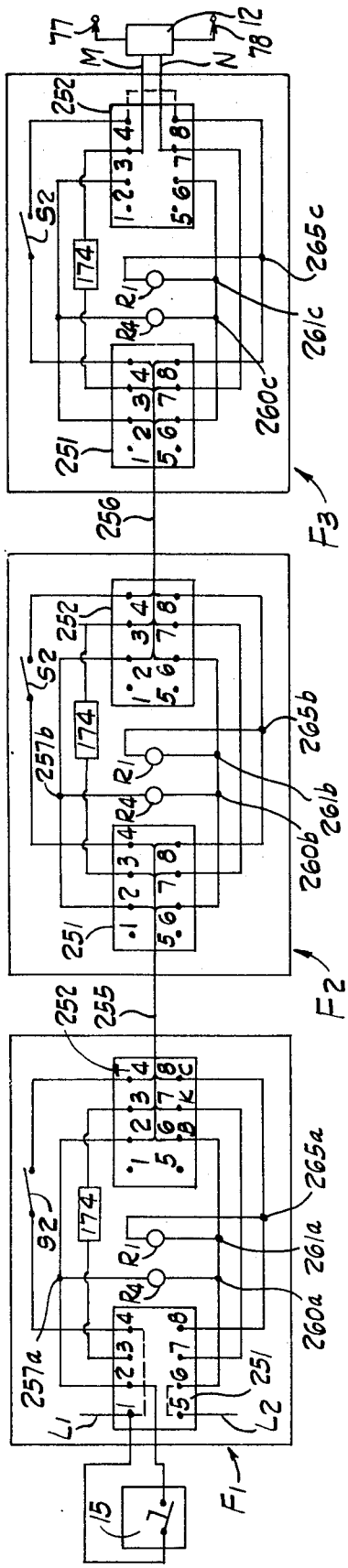
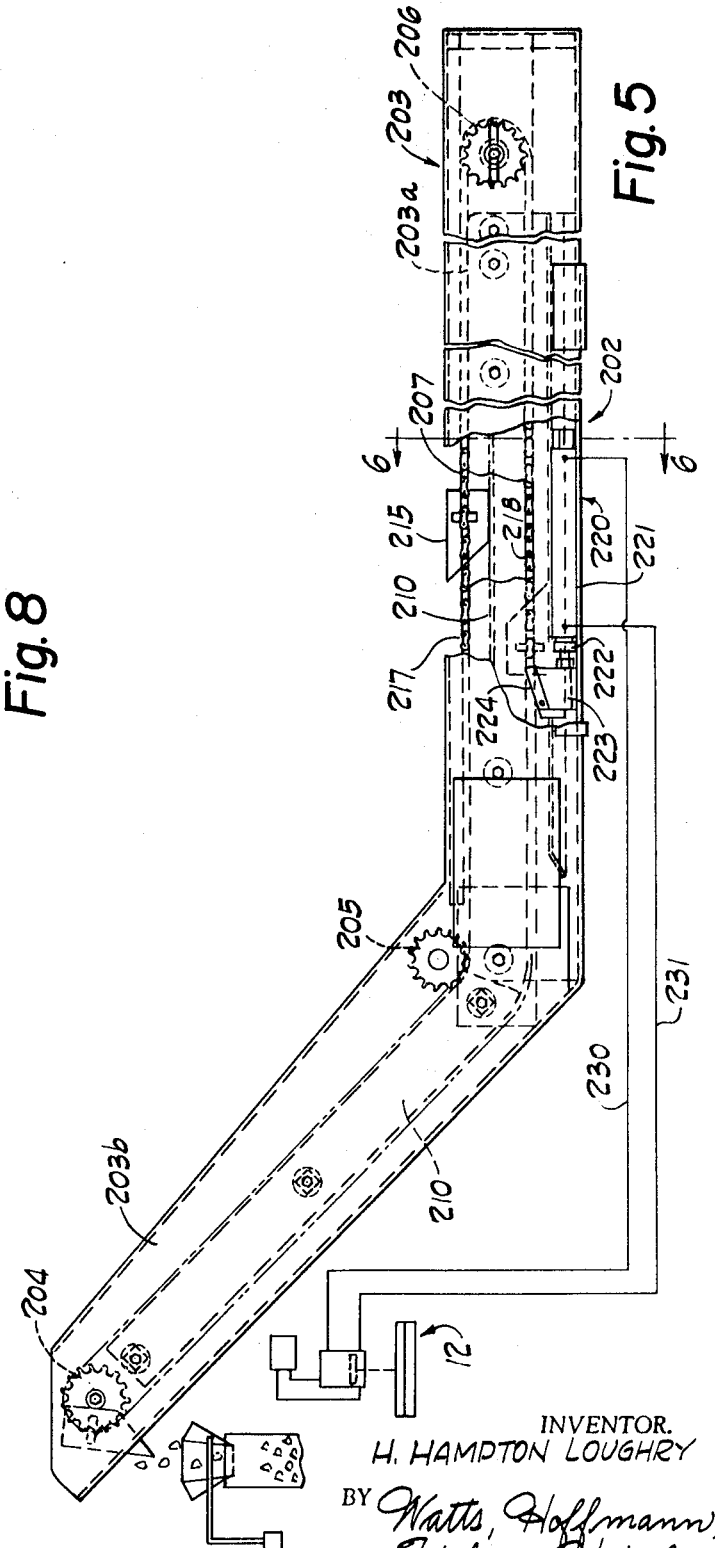

3,610,464

ARTICLE HANDLING APPARATUS WITH AUTOMATIC CONTROLS FOR SUPPLY AND DISPENSER

BACKGROUND OF THE INVENTION

1. Field of the Invention

The present invention relates to material handling apparatus and more particularly relates to apparatus for handling articles for the purpose of counting; or batch counting, dispensing and packaging.

2. The Prior Art

Packaging articles in plastic bags, or similar containers, for consumer sales as well as for inventory purposes is a widespread practice. Because of the great numbers and diversity of small articles desired to be packaged, accurate, high-speed counting and dispensing apparatus for handling such articles during the packaging process is in great demand.

The prior art has proposed a high-speed article counting apparatus, but such apparatus has been usable primarily for the purpose of obtaining inventories of small parts. Hence, the previously known apparatus has not been effective to accurately dispense such articles in batches for packaging and has not been efficiently adaptable to such purposes.

Some prior art proposals have suggested the use of an article feeder for advancing articles individually to a position from which the articles fall through a photoelectric detecting device which produces a counting signal when a falling article is detected. Such devices had relied on acceleration of the falling articles by gravity to space the articles apart sufficiently to detect only one article at a time. Because of reliance on gravitational attraction in counting the articles the prior art proposals have utilized extremely sensitive detectors which can be inadvertently triggered and the units have not been compact due to necessary spacing between the feeders and the detecting devices.

SUMMARY OF THE INVENTION

The present invention provides a new apparatus for counting, feeding and accumulating articles. When a batch of the articles is accumulated the batch is dumped into a container which is then sealed closed at a packaging station of the apparatus which is operatively associated with the apparatus. The new apparatus is compact, highly accurate and capable of high-speed operation by a single operator having only minimal experience in operating the apparatus.

One feature of the invention resides in the use of separate article feeders operated to advance articles at different speeds so that individual articles are widely spaced when they pass an article detection device. This insures accurate counting of the articles by detecting devices which need not be extremely sensitive, while permitting compact construction of the apparatus.

Another feature of the invention resides in the provision of an article accumulator structure into which articles are fed from the feeders. The accumulator structure is constructed to dump articles only when predetermined batches of articles are accumulated and then only when the operator desires the batch to be dumped. In a preferred construction, the accumulator is defined by a movable dump door which opens to dump the articles and is maintained open for a short period sufficient to insure complete emptying after which the door automatically recloses.

The apparatus provides a packaging station at which containers are conveniently positioned to receive batches dumped from the accumulator. A sealing unit is located at the packaging station and is operable in conjunction with operation of the accumulator, so that the individual containers, each containing a batch, are immediately sealed closed to complete the packaging operation.

Another feature of the invention resides in a control unit which is constructed and arranged to coordinate operation of the various units of the apparatus in such a way that feeding and counting occur automatically and a batch of articles is control unit prevents premature dumping of batches and when a batch is dumped the control unit initiates operation of a package-sealing unit.

The control unit governs operation of the feeder unit to reduce an initially high feed rate of the articles when a number of articles, slightly less than a batch, is counted; and the control unit terminates operation of the feeder unit when a batch of the articles is deposited in the accumulator. Slowing of the article feed rate reduces the possibility of oversupplying articles to the accumulator.

Still another feature of the invention resides in the adaptability of the apparatus to operate in conjunction with other such apparatuses and a conveyor so that batches consisting of various numbers of diverse articles can be deposited in a single container and packaged as a kit. These cooperating apparatuses are operated by a single operator, in substantially the same manner as a single apparatus.

Accordingly, a principal object of the invention is the provision of a new and improved method and apparatus for packaging batches of articles wherein articles are efficiently packaged by the use of an apparatus which quickly dispenses articles with a high degree of counting accuracy and permits high-speed packaging of the articles by a single operator having minimal experience with the apparatus.

Other objects and advantages will become apparent from the following detailed description of the invention.

BRIEF DESCRIPTION OF THE DRAWINGS

FIG. 2 is a perspective view of the apparatus illustrated in FIG. 1;

FIG. 4 is a perspective view of a kit-packaging system forming another preferred embodiment of the invention and utilizing a number of apparatuses of the type shown in FIGS. 1 and 2;

FIG. 5 is a fragmentary elevational view of a conveyor utilized in the system of FIG. 4 having portions shown in cross section;

FIG. 6 is a cross-sectional view seen from the plane indicated by the line 6—6 of FIG. 5;

FIG. 7 is an enlarged view of a part of the conveyor of FIG. 5; and,

FIG. 8 is a schematic illustration of electrical connections of individual apparatuses of the system of FIG. 4.

DESCRIPTION OF PREFERRED EMBODIMENTS

Figure 1:
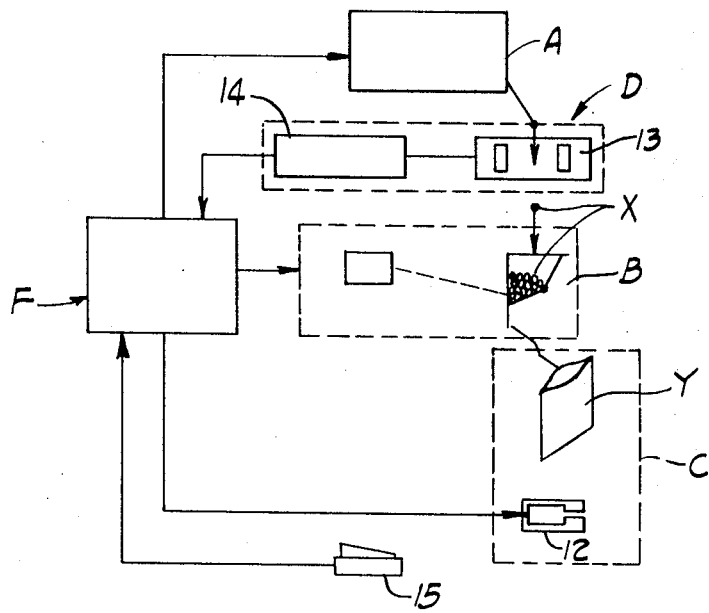
FIG. 1 is a schematic illustration of one preferred article dispensing and packaging apparatus constructed according to the present invention.
Figure 2A:
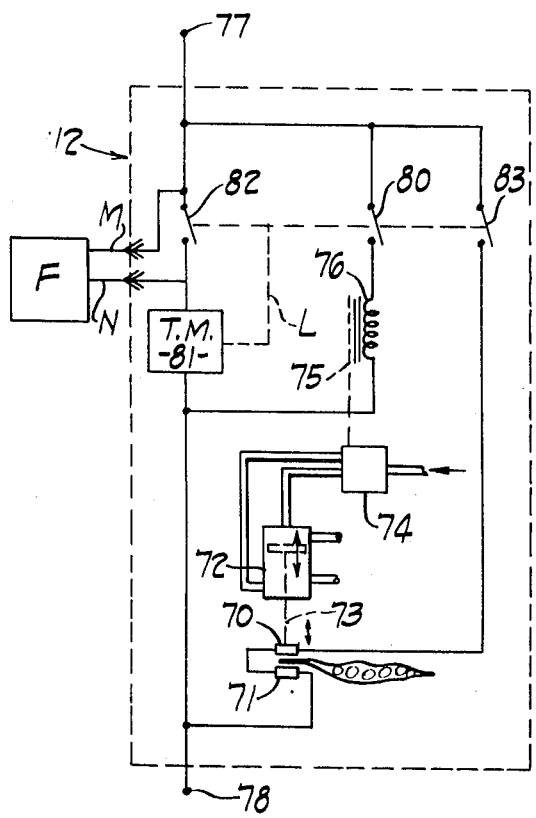
FIG. 2A is a schematic representation of a portion of the apparatus illustrated in FIGS. 1 and 2.
Figure 3:
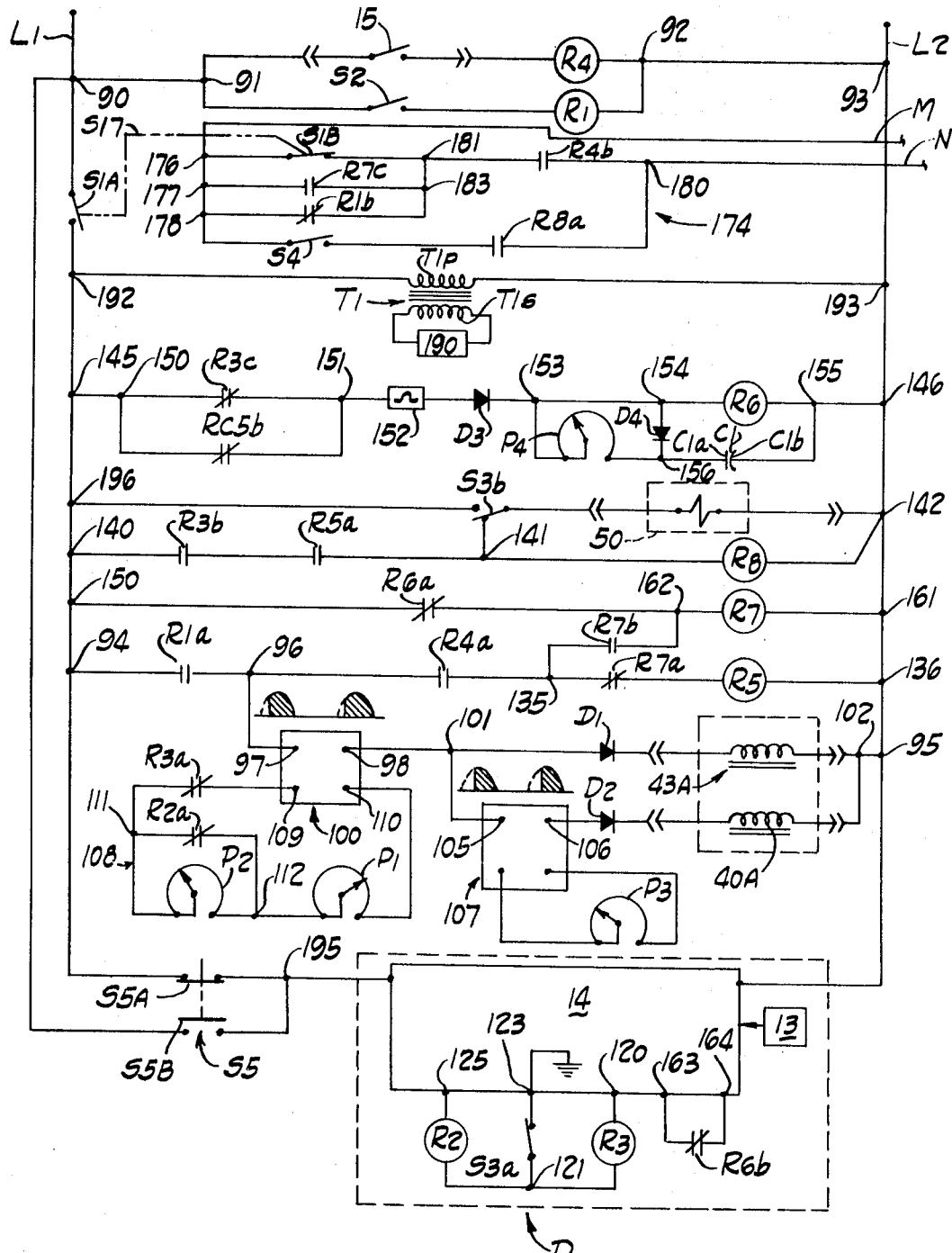
FIG. 3 is a circuit diagram of a control unit and a counter unit which form parts of the apparatus of FIGS. 1 and 2.

One preferred embodiment of apparatus 10 constructed in accordance with the present invention is illustrated in FIGS. 1–3 of the drawings. The apparatus 10 is schematically illustrated in FIG. 1 and is shown as including a feeder unit A from which articles X, such as pills, washers, screws, small vegetables, and the like are individually fed and dropped into an article accumulator structure B. The accumulator structure B is located above a packaging station C and when a batch of articles is contained by the accumulator B they are dumped into a container Y located at the packaging station. In the illustrated construction the container Y is a heat sealable plastic bag, described in greater detail presently, and a bag sealer unit 12 is located at the packaging station C for completing the packaging operation.

The apparatus 10 further includes a counter unit D for detecting and counting individual articles as they fall into the accumulator. The counter unit comprises a suitable detecting head 13 and a counter 14. The head 13 is constructed and arranged to detect articles X as they fall from the feeder unit A when an article is detected and the signal is transmitted to the counter 14. The counter 14 is operated in response to the signals from the detector to count the articles fed. The counter 14 is of a commercially available type, known as a "dual preset electronic counter" and may be purchased from Manufacturers Electrification Co. Accordingly, the counter is not described in detail except as it functions in relation to other parts of the apparatus.

A control unit F governs operation of the feeder unit A, the accumulator structure B, and the sealing unit 12 at the packaging station C in response to operation of the counter 14 and manual actuation of a foot pedal switch 15 by an operator of the apparatus. The control unit F functions to govern the operation of the noted units generally as follows. When the counter unit D has detected a prescribed number of articles X falling into the accumulator B, the counter unit D conditions the control unit F to terminate operation of the feeder unit A. The counter unit D additionally conditions the control unit F to cause the accumulator structure B to dump the articles when the foot pedal switch 15 is operated. The batch of articles X in the accumulator structure is dumped into the bag Y.

The control unit F effects operation of the bag sealing unit 12 as the batch of articles X is dumped into the bag Y so that the bag Y can be conveniently sealed by the operator. The control unit F also clears the counter 14 when the batch is dumped from the accumulator B so that a succeeding batch of articles is immediately fed to the accumulator as the bag Y is being sealed.

Referring now to FIG. 2 the apparatus 10 is illustrated as including a supporting body E which is sized to be conveniently disposed on a table top or the like. The body E includes a frame member 20 on which the feeder unit A, detecting head 12, and accumulator structure B, are supported. The counter and control units are modular units which are detachably connected to the body E preferably being supported in the housing 23 by a pedestal 24.

In the preferred construction, the counter and control units are provided with control panels H1, H2, respectively, accessible to the operator. The control panel H1 of the counter unit includes a suitable control knob which is turned by the operator to select the number of articles X forming a batch. The panel H2 of the control unit supports a number of switch buttons or levers which are actuated by the operator to operate switches for controlling the mode of operation of the apparatus. These switches are described in detail presently in connection with control unit circuitry. The levers, etc. for operating these switches are conventional; suffice it to say that normally "on/off" and "feed" switch levers on the panel are positioned to condition the apparatus for operation as has been described.

The foot switch 15 is preferably located on the floor below the table and is connected to the control unit by an electrical cable 25.

THE FEEDER UNIT A

The feeder unit A includes first and second feeders 31, 32 respectively, for directing articles X individually to the accumulator structure B. The feeder 31 is a conventional "bowl" type feeder which includes a hopperlike bowl 33 in which a supply of articles is maintained. The bowl 33 is provided with an interior spiral ramp 34 extending at a slight upward incline from the base of the bowl to a discharge opening 35 in an upper lip 36 of the bowl.

The bowl 33 is supported by a conventional motor assembly 40 which vibrates the bowl causing the articles X to move individually along the ramp 34 upwardly at a speed determined by the electrical power supplied to the motor assembly 40. The motor 40a (FIG. 3) is conventional and therefore is only generally described. In the preferred construction, the motor is defined by a coil and an armature. The coil is energized to oscillate the armature at a 60 cycle frequency. The armature imparts 60 cycle vibrations to the bowl 33. The magnitude of the power supplied to the coil determines the amplitude of the bowl vibrations and the advancing speed of the articles on the ramp 34 increases and decreases with increases and decreases in the amplitude of the vibrations. The motor assembly 40 is attached to the frame 20 and suitable dampers 41 are disposed between the assembly 40 and the member 20 for vibration isolation.

The second feeder 32 receives articles from the discharge opening 35 of the feeder 31 and accelerates the articles while moving them individually to a discharge location from which the articles drop into the accumulator structure B. The second feeder 32 includes a body 42 defining a straight slot or through 42a along which the articles are fed.

A conventional motor assembly 43 including a motor 43a supports the body 42. The motor 43a vibrates the body 42 to propel the articles X along the slot 42a in the same manner as is described in reference to the feeder 31. The motor vibrates the body 42 at greater amplitudes of vibration than the hopper 33, as is described presently, so that the articles X are accelerated when they move from the ramp 34 to the slot 42a. Because the articles are fed at greater speeds along the body 42, the articles are spaced substantially apart when they drop into the accumulator B. This spacing insures that the detector unit 13 discriminates between individual articles dropping into the accumulator.

THE ACCUMULATOR STRUCTURE

The accumulator structure B is formed by a tubular chute 45 integral with the body E and a dump door 46 disposed in the chute and movable about a hinge 47 to dump batches of articles. The dump door 46 is biased to a closed position in which the door extends across the chute 45 for accumulating the articles. When the door is moved away from the closed position, the accumulated articles fall from the accumulator to the packaging station C.

The dump door is operated to its open position by a solenoid actuator 50 connected to the door 46 by a linkage 52. When the solenoid is energized the linkage swings the door 46 open. As is described in more detail presently, the solenoid 50 can only be energized when a batch of articles has been fed to the accumulator and when the foot pedal 15 is operated. Hence, a partial batch cannot be dumped by premature operation of the foot pedal; and full batches cannot be dumped until the operator is ready and presses the foot pedal.

The door 46 remains open for a short time (i.e., no more than two seconds) to insure complete emptying of the accumulator. The solenoid 50 is then deenergized and the door 46 is reclosed to receive a succeeding batch of the articles.

THE PACKAGING STATION

The batch of articles is dumped into an open bag Y located at the packaging station C. In the preferred embodiment, the packaging station is defined by an apparatus 53 of the type illustrated and described in U.S. Pat. Ser. No. 634,251, filed Apr. 27, 1967 to Automated Packaging Corp. The apparatus 53 is described generally here and reference should be made to the noted patent application for further details of operation.

The bags Y are of a heat sealable plastic material with each bag being formed on a continuous weblike roll or spool of bags supported in the apparatus 53. As is best seen in FIG. 2 the bags Y are formed by sheetlike faces of plastic material. One face of the bag is connected in the web along the edge forming tear lines and the other face is "separated" from the connected face in that the bottom edge 55 and sides 56 of the faces are sealed together, and the upper end 57 is open for receiving a batch of articles. The bag Y at the end of the web is connected to a succeeding bag Y along the weakened tear line so that when the bag Y at the end of the web is filled with articles it is quickly detachable by the operator who tears it from the web.

The free end of the web of bags extends through a slit 59 in a forward wall 60 of the apparatus 53. As seen in FIG. 2 the bag Y at the end of the web is positioned for receiving articles in the packaging station. The succeeding bag Y extends a substantial distance over the forward wall 60 so that when the bag at the end of the web is detached, the succeeding bag is quickly advanced into position for receiving the next batch. An air blower (not shown) is supported in the apparatus 53 and directs a blast of air through the slit 59, which opens the bags Y as they pass through the slit. Hence, the bags Y are already opened when positioned for receiving a batch of articles.

An adjustable guide 61 directs the articles into the bag. The guide 61 is a sheet metal funnellike member which converges the falling articles toward the open bag Y. A support structure 62 adjustably secures the guide 61 to the wall 60. The support structure 62 includes a rail 63 fixed to the front wall 60, a slide 64 vertically movable along the rail and carrying a set screw 65 which locks the slide at a particular location on the rail. The slide 64 also carries a support bar 67 to which the guide is connected by a clamp 68. The support bar 67 and guide 61 are thus vertically adjustable with respect to the accumulator, and the guide 61 is adjustably slidable horizontally along the bar 67.

When the bag Y has received a batch of articles, it is torn from the web and its upper end 57 is sealed closed by electrically heated sealing jaws, 70, 71 in the sealing unit 12. The heated jaws clinch the end 57 of a bag Y to heat seal the bag closed. One such bag Y is illustrated being sealed by the jaws in FIG. 2.

Referring now to FIG. 2A a system G for controlling operation of the heating jaws 70, 71 is schematically shown. The system G includes a pneumatic actuator 72, preferably of the piston-cylinder type, connected to the jaw 70 by a linkage 73. Pressurized air is supplied to the actuator 72 through a valve 74. When air is directed to the actuator 72 the jaw 70 is moved toward the jaw 71 and the open end 57 of the bag Y is firmly gripped between them.

The valve 74 is operated by the armature 75 of a timer controlled solenoid 76. When the solenoid 76 is energized, the valve 74 supplies air to the actuator. The solenoid 76 is energized by a circuit completed between terminals 77, 78 of an electric power supply through contacts of a control switch 80 connected in series with the solenoid.

Operation of the solenoid control switch 80 is governed by a timer motor 81 which is initially operated from the control unit F. In the illustrated system, the timer motor 81 is electrically connected across the power supply terminals 77, 78 through part of the control unit F via conductors M, N (FIG. 2). The control unit F functions to initially energize the timer motor 81 in a manner described presently.

When the timer motor 81 is initially energized, a holding circuit is established for maintaining the timer motor energized for a full cycle of its operation. A switch 82 is linked to the motor 81 and closes immediately upon energization of the timer motor. The switch 82 remains closed throughout the cycle of operation of the motor and is opened by the timer motor to interrupt the holding circuit thus completing the timer cycle.

The solenoid control switch 80 is also linked to the timer motor and its contacts are closed and reopened by the timer motor during the timer cycle. Operation of this switch controls actuation of the sealing jaws as noted.

The sealing jaws 70, 71 are resistance heated elements which in the illustrated system G, are connected across the power supply terminals 77, 78 through a switch 83 operated by the timer motor. The switch 83 is closed to effect heating of the jaws just prior to sealing the bags.

The linkage L between the timer motor 81 and switches 80, 82, 83 is schematically shown. Preferably, this linkage is in the form of a switch camming mechanism driven by the motor

THE CONTROL UNIT F

FIG. 3 is a schematic diagram of the circuitry constituting the control unit F and the connection of the control unit to the counter unit D. The control unit F is connected across a 60 cycle single phase alternating current power supply through lines L1, L2, respectively, although as is apparent from the description, other suitable power supplies can be utilized.

The control unit F governs operation of the feeder unit A, the accumulator B, and the sealing unit 12. Power is supplied to the circuitry in the control unit F which governs operation of the feeder unit A and the accumulator B through contacts S1a of an "on/off" switch S1. The switch S1 is preferably manually operated by a knob or lever on the panel H2 of the control unit F.

Assuming that the control switch contacts S1a are closed and that it is desired to feed and package articles, the "feed" switch S2 is closed by the operator to condition the control unit F for operating the feeder unit A, accumulator B, and the apparatus at the packaging station C in the manner described generally above.

The closed "feed" switch initiates operation of electric motors 40a, 43a, of the feeders 31, 32, respectively so that the feeder unit A is operated to feed articles into the accumulator. The feed switch S2 is connected in series with a relay R1 and when closed establishes an energizing circuit for the relay R1 from a junction 90 at the line L1, through a junction 91, the closed contacts of the feed switch S2, the relay R1, a junction 92, and to a junction 93 at the line L2.

The relay R1 includes contacts R1a which close when the relay R1 is energized and establishes energizing circuits for the feeder motors 40a, 43a. An energizing circuit for the feeder motor 43a can be traced from a junction 94 at the line L1 through the closed relay contacts R1a a junction 96, across terminals 97, 98 of a power-controlling device 100, commercially known as a Triac, a junction 101, a diode D1, the feeder motor 43a, a junction 102 and to the line L2 at the junction 95.

An energizing circuit for the motor 40a is completed from the junction 94 at the line L1 through the relay contacts R1a, the Triac 100 to the junction 101, across terminals 105, 106 of a Triac 107, a diode D2, the feeder motor 40a and through the junction 102, 95, to the line L2.

The Triac 100 is essentially a voltage controlled triggering device which is abruptly rendered conductive to complete a circuit across the terminals 97, 98 at a power supply phase angle determined by an instantaneous voltage level in a control circuit 108 for the Triac. The power phase angle at which the Triac 100 is rendered conductive is governed by the control circuit 108 which is connected across input terminals 109, 110, of the Triac 100. When operation of the feeders 31, 32 is initiated the control circuit is established from the terminal 109 through normally closed relay contacts R3a, junction 111, normally closed relay contacts R2a, a junction 112, a potentiometer P1 and to the terminal 110.

The impedance of the control circuit 108 is varied to adjust the phase angle at which the Triac 100 is triggered. The closed relay contacts R2a, are connected in parallel with the potentiometer P2 to shunt the potentiometer P2 when the feeders are initially operated. The resistance across the terminals 109, 110 of the Triac 100 is thus determined by the resistance of the potentiometer P1. Hence, when the contacts R2a are closed the resistance of the potentiometer P1 determines the time during a half cycle of the power supply at which Triac is rendered conductive. The resistance of the potentiometer P1 is preferably varied by manually turning an adjusting knob on the control panel H2. As the potentiometer resistance is decreased, the Triac 100 is fired earlier in a half cycle of the power supply and as the resistance of the potentiometer P1 is increased the Triac 100 fires later in the half-cycle.

When the relay contacts R2a open, the potentiometers P1 and P2 are connected in series across the terminals 109, 110 ing the firing angle of the Triac. When the firing angle of the Triac 100 is so retarded, the power supplied to the feeder motor 43a is reduced, thus reducing the feeding rate of articles from that feeder. When the relay contacts R3a open, the control circuit 108 is interrupted thereby preventing the Triac 100 from firing and terminating operation of the feeders 31, 32.

The motor 43a is energized only by half wave rectified power, modulated by the Triac 100. Thus the diode D1 is oriented to permit conduction through its anode and cathode electrodes only from the line L1 to the line L2. A typical wave configuration of the energizing power supplied to the motor 43a, as a function of voltage and time, is shown in FIG. 3 just above the Triac 100.

The power supplied to the motor 40a is governed by the Triacs 100, 107 and the diode D2. The diode D2 is poled to provide half wave rectified power through the motor 40a from the line L1 to the line L2. The half wave power is modulated by the series connected Triacs 100, 107. The wave form of the half wave rectified power supplied to the motor 40a, as a function of voltage and time is shown in FIG. 3 just above the Triac 107.

The Triac 107 functions substantially the same as the Triac 100 described above. It is apparent from the illustrated wave forms that the Triac 107 is conditioned to be rendered conductive later in a half cycle of the power supply than the Triac 100 and accordingly the power supplied to the feeder motor 40a, is indicated by the cross-hatched portions of the voltage wave form applied to that motor is substantially less than the power supplied to the feeder motor 43a.

The phase angle at which the Triac 107 fires is governed by a control circuit established across control terminals of the Triac 107 through a potentiometer P3. The resistance of the potentiometer P3 determines the firing angle of the Triac 107. Hence, when the resistance in the control circuit is increased by adjusting the potentiometer P3, the power supplied to the feeder motor 40a is reduced due to the retarded firing angle of the Triac. Reducing the resistance of the potentiometer P3 advances the firing angle of the Triac 107 increasing the power supplied to the feeder motor 40a. Because the Triac 107 is connected in series between the Triac 100 and the feeder motor 40a, the power dissipated across the motor 40a can never exceed the power supplied to the feeder motor 43a and is preferably less than the power supplied to the feeder motor 43a. The operator manually adjusts the potentiometer P3 by turning a knob on the control panel H2.

Because of the noted functions of the Triacs 100, 107 in supplying different amounts of electrical power to the feeder motors, the feeder 32 operates to accelerate the articles moved from the feeder 31 as a function of the increased power supplied to the motor 43a.

INTERCONNECTION OF THE COUNTER AND CONTROL UNITS

The counter unit controls operation of the Triac 100 in response to the number of articles fed to the accumulator. As seen in FIG. 3 the counter 14 is connected to relays R2, R3 and energizes these relays successively to first reduce the feeding speed of articles dropped to the accumulator when a predetermined number of articles has been fed, and then to terminate operation of the feeders when a batch of the articles is present in the accumulator.

If for example, it is desired to accumulate batches of 20 articles each, the counter 14 is manually adjusted so that relay R3 is energized when 20 articles are detected by the head 13 and counted. The relay R3, which is referred to as the "batch relay", is energized through a circuit completed from an output terminal 120 of the counter, through a junction 121, a closed "count" switch 122, and to a grounded terminal 123 of the counter. The relay R3 is linked to the normally closed contacts R3a in the control circuit for the Triac 100, and when the relay is energized these contacts open rendering the Triac In the preferred construction, the counter energizes the relay R2 to slow the feed rate of articles from the feeder when a number of articles, less than a batch, have been fed. For example, if a 20 article batch is desired, the feeders might slow the feed rate when 17 articles are counted. This minimizes the possibility of an oversupply of articles.

Slowing the feed rate is accomplished by opening the normally closed relay contacts R2a connecting the potentiometers P1, P2 in series across the control terminals of the Triac 100 to reduce the power supplied to both feeder motors. The relay R2 is energized through a circuit from the counter terminal 125 through the relay R2, the junction 121, count switch contacts S3a and to the terminal 123.

When the batch is completed at the slow feeding rate, the relay R3 is energized to terminate feeding of articles. In addition to terminating operation of the feeder unit A, energization of the batch relay R3 enables the accumulator to dump the articles. The relay R3 thus includes contacts R3b which are connected in circuit with the solenoid actuator 50 in the control unit. These contacts close when the relay R3 is energized so that the solenoid 50 can be energized therethrough as is described presently.

OPERATION OF THE ACCUMULATOR B

The accumulator B is operated to dispense a batch of articles contained when a complete batch of articles has been counted by the counter 14 and then only when the foot pedal switch 15 connected across the power supply between the junctions 90, 93, is closed to establish an energization circuit for a relay R4 from the line L1 through the junctions 90, 91 the closed foot switch 15, the relay R4, junctions 92, 93, and to the line L2.

Energization of the relay R4 enables a packaging cycle to continue when a batch of articles is contained in the accumulator. The relay R4 normally open contacts R4a which close to complete an energizing circuit for a cycle relay R5. The energizing circuit for the cycle relay R5 is traced from the junction 94 at the line L1, through the closed contacts R1a of the relay R1, junction 96, closed contacts R4a of the relay R4, a junction 135, normally closed contacts R7a of the relay R7, which is described presently, the relay R5 and a junction 136 at the line L2.

The cycle relay R5 is operated to enable the dump door 46 to be opened when a batch of articles is accumulated. To this end the relay R5 has contacts R5a in series with the dump door actuating solenoid 50. The contacts R5a are also connected in series with the contacts R3b of the batch relay R3. Hence, the solenoid 50 can only be energized when the "cycle" and the "batch" relays are concurrently energized. The solenoid 50 is energized through a circuit traced from the line L1 through a junction 140, relay contacts R3b, R5a, a junction 141, a switch S3, the solenoid 50 and to the line L2 through the junction 142.

From the foregoing description, it is apparent that the dump solenoid 50 can only be energized to open the dump door when a batch of articles is fed to the accumulator. Furthermore, the dump solenoid can then be energized only when the foot pedal switch 15 is operated to effect energization of the "cycle" relay R5.

If desired, the solenoid 50 can be continuously energized, maintaining the dump door open and preventing accumulation of articles. Generally the solenoid is only maintained when the apparatus is used for inventory purposes, as is described in more detail presently, but can be maintained open under other appropriate circumstances by manual actuation of the switch S3. The switch S3 is a single-throw double pole switch which as noted, is normally positioned so that the solenoid is only energized when the relay contacts R3b and R5a are closed. However, the switch S3 is actuable to continuously energize the solenoid 50 from a junction 143 at the line L1 through the contacts of the switch S3 and to the line L2 through the junction 142.

The control unit F includes a timing circuit for reclosing the dump door 46 after a brief open interval and for resetting the counter 14 for a succeeding packaging operation. The time delay circuit includes a normally energized timing relay R6 connected in parallel with a charging circuit across the lines L1, L2 by way of junctions 145, 146, respectively. The timing relay R6 is normally energized through a circuit which can be traced from a junction 145, through a junction 150, normally closed contacts R3c of the relay R3, a junction 151, a load resistor 152, anode and cathode electrodes of a diode D3, junctions 153, 154, the relay R6, a junction 155 and to the line L2 through the junction 146. The diode D3 is poled to produce half wave rectified power through the relay R6 from the line L1 to the line L2.

The timing relay can only be deenergized when a batch of articles has been accumulated and the foot pedal switch 15 closed; i.e. upon concurrent energization of the relays R3 and R5. Thus, the normally closed contacts R5b of the relay R5 are connected in parallel with the normally closed relay contacts R3c so that the relay R6 is energized if either set of contacts is closed. This arrangement prevents opening of the door 46 while articles are being fed into the accumulator, or opening of the door when a complete batch of articles is in the accumulator but prior to closing of the switch 15.

The charging circuit is connected in parallel with the relay R6 between the junctions 154, and 155 and includes a diode D4 having its anode and cathode electrodes oriented to conduct from the junction 154 to a plate C1a of the capacitor C1 through a junction 156. The charging circuit is completed from the plate C1b of the capacitor C1 through the junction 155 and 146. The capacitor C1 is quickly charged through the diode D4, when the relay R6 is energized, due to the relatively low impedance of the resistor 152. The capacitor supplies current to the relay R6 during half cycles of the power supply during which the diode D3 would otherwise prevent energization of the relay R6.

When a batch has been accumulated and the foot pedal switch 15 is actuated, the relay contacts R3c, and R5b are opened interrupting the energizing circuit for the relay R6. A discharge path for the capacitor C1 is then established through the relay R6 to maintain that relay energized for a brief period subsequent to the relay contacts R3c, R5b opening. The discharge path for the capacitor C1 is established from the plate C1a of the capacitor through the junction 156, a potentiometer P4, the junction 153, junction 154, the relay R6, junction 155, and to the plate C1b of the capacitor. The capacitor C1 and potentiometer P4 are chosen so that the relay R6 may be maintained energized for a maximum of about 2 seconds.

When the relay R6 is deenergized, its contacts R6a, R6b are closed to effect reclosing of the dump door 46 and resetting the counter 14, respectively. The contacts R6a, are connected in series with an antirepeat relay R7 which, when energized, effects reclosing of the dump door 46 by deenergizing the cycle relay R5. The relay R7 maintains the cycle relay deenergized until the foot pedal switch is opened so that successive cycles of the apparatus cannot be performed should the operator hold the foot pedal switch closed. Deenergization of the cycle relay R5 opens its contacts R5a interrupting the energizing circuit for the door-actuating solenoid 50 and thereby reclosing the dump door 46. The relay contacts R5b are simultaneously reclosed to reenergize the timing relay R6.

Even though the timing relay R6 is reenergized when the relay R7 is energized, the relay R7 is maintained energized so long as the foot pedal switch remains closed thus locking out the cycle relay R5. The relay R7 is maintained energized by its normally open contacts R7b which close upon energization of the relay R7 to establish a holding circuit for the relay from the junction 94 through the contacts R1a, junction 96, contacts R4a, junction 135, contacts R7b, junction 162, the relay, and to the line L2 through the junction 161. So long as the foot pedal switch 15 is maintained closed by the operator, the contacts R4a remain closed and the cycle relay R5 is locked out by the holding circuit.

It will be appreciated from the foregoing that the timing relay R6 is deenergized only momentarily and therefore its contacts R6a, R6b close briefly once in each cycle of the apparatus. As previously noted, the contacts R6a close momentarily to energize the antirepeat relay R7 which is then maintained self-energized through the noted holding circuit. The contacts R6b are connected across terminals 163, 164 of the counter 14 and these contacts close to reset the counter to zero. When the counter 14 is reset, the slow feed and batch relays R2, R3, respectively are deenergized. Deenergization of the relays R2, R3 reinitiates operation of the feeder unit A through the Triacs 100, 107. Deenergization of the relay R3 also reopens the contacts R3b in the energizing circuit for the solenoid 50. Further, the contacts R3c in the energizing circuit for the timer relay R6 are reclosed to establish the alternate energizing circuit for that relay in parallel with the closed relay contacts R5b.

The cycle of the apparatus is completed by opening of the foot pedal switch 15 by the operator which deenergizes the relay R4 interrupting the holding circuit for the antirepeat relay R7 by opening the contacts R4a, and thus enabling reenergization of the cycle relay R5 when the foot pedal switch is next closed.

THE SEALING UNIT CONTROL CIRCUITRY

The control unit F further includes a control circuit 174 governing operation of the timer motor 81 for the sealing unit 12. The control circuit 174 is constructed and arranged to permit operation of the sealing unit under various operational conditions of the apparatus 10.

A "mode" switch S4 has contacts in the control circuit 174 and conditions the control circuit to energize the timer motor 81 when the dump door 46 is opened. The timer motor 81 is energized through a circuit traced from the conductor M connected to the power terminal 77 (FIG. 2A) through junctions 176–178, closed contacts of the "mode" switch S4, closed relay contacts R8a, to a junction 180 and to the timer motor through the conductor N.

The relay contacts R8a are associated with a relay R8 connected in parallel with the dump solenoid 50. The relay R8 is energized concurrently with the solenoid 50 during the normal operation of the apparatus. Hence, energization of the timer motor 81 through the "mode" switch S4 and relay contacts R8a occurs when the dump door is first opened. Operation of the sealer unit follows as described above in reference to FIG. 2A.

The control circuit 174 also provides for operation of the sealing unit 12 from the foot pedal switch 15 when the "on/off" switch S1 is in the "off" position. The switch S1 includes contacts S1b in the control circuit 174 which are closed when the contacts S1a are open. The contacts S1b permit establishment of a timer motor energizing circuit when the foot pedal switch 15 is closed. This energizing circuit is traced from the conductor M through the junction 176, the switch contacts S1b, a junction 181, closed relay contacts R4b, the junction 180 and to the timer motor 81 through the conductor N. Thus the sealing unit can be operated manually and independently of the control unit F; i.e. when the control unit F is turned "Off".

When the "mode" switch S4 is opened, the sealing unit is normally operated from the circuit 174 by operation of contacts R7c of the antirepeat relay R7. The relay R7 is energized when the foot pedal switch is closed to dump accumulated articles and the contacts R7c close when the relay R7 is energized. The relay contacts R7c are connected in the control circuit 174 in series with the contacts R4b and these contacts close to establish a timer motor energizing circuit from the conductor M through the junctions 176, 177, closed contacts R7c, junctions 183, 181, contacts R4b, and to the timer motor 81 through the conductor N.

If recycling the sealing unit 12 without recycling the apparatus 10 is desired, the foot pedal switch 15 is maintained closed by the operator after a cycle of the apparatus has been completed. The closed foot pedal switch maintains the relay R7 energized through its holding circuit to prevent recycling of the apparatus 10. The contacts R7c and R4b remain closed so that the timer motor is reenergized immediately upon completing a cycle of its operation.

Alternatively, it may be desirable to operate the sealing unit 12 when the control unit F is "on" but the "feed switch" is opened. Under such conditions, the timer motor 81 is energized upon closing the foot pedal switch 15. As seen in FIG. 3, the relay R1 has normally closed contacts R1b in the control circuit 174 which are closed when the "feed" switch S2 is opened. These closed contacts establish a timer motor energizing circuit from the conductor M through the junctions 175-178, the closed contacts R1b, junctions 183, 181, the contacts R4b, the junction 180, and to the timer motor 81.

The preferred embodiment of the present invention includes an indicator light circuit generally designated at 190 which includes a number of indicator lights associated with various of the function controlling switches described above. The indicator light circuitry forms no part of the present invention and accordingly is illustrated schematically only. Preferably, the light circuit 190 is a low voltage circuit which is coupled to the control unit F by an isolation transformer T1 having its secondary winding T1s in series with the circuitry 190 and its primary T1p connected across the lines L1, L2 through the junctions 192, 193. The indicator lights are conveniently mounted in the control panel of the control unit F and are associated with suitable indicia on the panel.

MALFUNCTION ISOLATING TEST CIRCUITRY

In the preferred embodiment of the invention, the counter and control units are connected together so that should a malfunction occur in either the counter unit or the control unit, the unit in which the malfunction has occurred can be determined immediately by the operator. More specifically, these units are interconnected by a malfunction isolating switch S5 which is actuable to permit operation of the counter unit independently of the control unit.

As shown in FIG. 3, the counter 14 and detector head 13 are connected across the lines L1, L2 between the junctions 94, 95 through normally closed contacts S5a of the malfunction isolating switch S5.

With the control unit F and counter unit D so coupled together, a malfunction in one unit or the other may cause the apparatus to fail to operate properly, and it is not generally apparent which of the units is malfunctioning.

Accordingly, the malfunction isolating switch S5 includes normally open contacts S5b which can be manually closed by the operator of the apparatus to connect the counter unit 14 across the power supply from the junction 90 at the line L1 and to the line L2 through the switch contacts S5b and a junction 195. The switch S5 is preferably a pushbutton switch biased to the position in which the contacts S5a are closed. When the switch S5 is held down the contacts S5b are closed to operate the counter 14 independently of the control unit F.

If the counter unit D operates properly with the switch S5 depressed, the malfunction must be in the control unit F; on the other hand, if the counter unit D does not operate when the switch S5 is depressed, a malfunction is known to exist in the counter unit. The feature is important for two reasons: First, the counter unit is a modular commercial type which is not likely manufactured by the producer of the control unit. Hence, isolating the malfunctioning unit insures that the user can obtain servicing or repair through the auspices of the appropriate manufacturer with a minimum of confusion as to which unit should be serviced. Secondly, since the counter and control units are modular, the malfunctioning unit can be readily replaced with a minimum amount of lost production.

OPERATION OF THE APPARATUS FOR INVENTORY OF PARTS

It is sometimes desirable to utilize the apparatus 10 to provide inventory information. For inventory purposes, the feeder unit A operates continuously and the articles counted are not accumulated. The switch S3 has a normal position in which the apparatus 10 operates to package batches of articles as described. The switch S3 is actuated from its normal condition to permit the apparatus to inventory parts.

When the switch S3 is actuated, the "batch" switch contacts S3a thereof in the counter output circuit open to prevent energization of either of the relays R2, R3 by the counter. The contacts S3b of the switch S3 are also operated to continuously energize the dump solenoid 50 and thus maintain the dump door open. The energizing circuit for the solenoid 50 is traced from a junction 196 at the line L1, through the switch contacts S3b, the solenoid 50, and the junction 142. This circuit is independent of the relay contacts R3b, R5a, and hence maintains the solenoid energized regardless of the conditions of these contacts.

FIGS. 4-8 illustrate a system 200 for packaging various types of articles in plastic bags and which is particularly useful in packaging parts for kits. The system 200 includes three feeder units A1, A2, A3; three accumulator units B1, B2, B3; three counters and three control units F1, F2, F3, respectively. The counter and control units for the feeders and accumulators are positioned on a suitable work table adjacent a packaging station C which is defined by a single apparatus 53 including a bag sealing unit 12.

A conveyor unit 201 extends below the accumulators B1, B2, B3, and to a position above the packaging station C so that articles which are dispensed to the conveyor unit by the accumulators are dumped into the packaging station. Operation of the apparatus in packaging the articles is controlled by a foot switch 15 located on the floor below the packaging station C, and this switch is connected in an electrical circuit with the control units F by an electrical cable 25.

The conveyor unit 201 is of a commercially available type and includes a frame 202 having a horizontal section 203a and inclined section 203b. The frame 202 supports spaced sprockets 204, 205, 206, around which a chain 207 is reaved. Chain guide plates 210, fastened to the frame 202, are disposed between the upper and lower reaches of the chain so that the chain is guided between the sprockets.

The chain 207 carries a plurality of buckets 215. Preferably, individual links of the chain include fastener structures 207a to which the buckets 215 are nonrotatably connected. The chain moves counterclockwise (FIG. 5) around the sprockets through the frame 202 and the buckets are carried along by the chain.

The buckets 215 ride on a bucket support surface 216 attached to the frame 202. The support surface 216 extends along the upper reach 217 of the chain so that the buckets are vertically supported as they are conveyed, open end up, along the upper reach. The chain 207 is intermittently moved as is described presently so that each bucket moves from accumulator to accumulator intermittently. Hence, each bucket receives parts from each successive accumulator.

Movement of the chain in the manner described is effected by an actuator 220. The actuator 220 is of the piston-cylinder pneumatically operated type, and includes a cylinder 221 housing a double-acting piston. The cylinder 221 is supported by the frame 202 below the lower reach 218 of the chain and the piston rod 222 extends from the cylinder parallel to the lower reach.

A sliding block 223 is carried by the piston rod 222 and the block 223 slides horizontally and parallel to the lower reach 218 as the piston rod 222 moves in and out of the cylinder 221. The block 223 carries an operating finger 224 which engages the chain to effect movement of the chain counterclockwise in the frame 202.

The operating finger 224 engages projections 225 extending from the chain (see FIG. 5) and is supported on the slide block 223 by a hinge construction 226. A spring 227 is disposed between the finger 224 and the block 223 to urge the finger to its position shown in FIGS. 5 and 7. As seen in FIG. 7 the spring enables deflection of the finger 224 towards horizontal so that when the piston rod 222 moves out of the cylinder, the projections 225 on the chain deflect the finger downwardly and the chain remains stationary as the block 223 and finger 224 are moved toward the left as seen in FIGS. 5 and 7. On a return stroke of the piston rod 222 and end face 224a on the finger 224 engages a projection 225 on the chain to index the chain a distance determined by the length of stroke of the piston rod. The length of stroke is related to the distance between the accumulator structures B1, B2, B3 and accordingly, a bucket 215 is located below each accumulator B at the termination of an advancing stroke of the actuator 220.

The cylinder 221 is connected to a pneumatic pressure source through air lines 230, 231 which extend from opposite ends of the cylinder to the sealer unit 12 (FIG. 5). The air lines 230, 231 are connected on opposite sides of a double acting piston which controls operation of the sealing jaws. Hence, when the valve for controlling operation of the sealing jaws is operated, the actuator 220 is also operated. Since the conveyor is operated at the same time as the sealing jaws, the conveyor is indexed only after feeding and dispensing of the articles to the three individual buckets located below the accumulators.

FIG. 5 shows a bucket which has sequentially received parts from the accumulators and ascended the inclined run of the chain to the dispensing position. Since the buckets are non-rotatably connected to the chain, the contents of each bucket is dumped when that bucket rounds the sprocket 204. The parts in each bucket are dumped to the packaging station for further handling as is described above in reference to FIGS. 1-3.

The dumped buckets 215 are carried, inverted, along the lower reach 218 of the chain and ultimately around the sprocket 206 from which they are conveyed along the surface 216 and receive from the accumulators the parts.

As has been noted, the buckets move intermittently along the conveyor. The stroke of the piston rod 222 is an even fraction of the distance between each accumulator B1, B2, and B2, B3. Hence, each bucket is stationary beneath each accumulator during its travel along the conveyor and receives a batch of articles from each accumulator during the stationary intervals.

The control and counter units of each of the three feeding and dispensing apparatuses are connected together or interlocked by suitable coaxial cables so that operation of the system 200 is governable by an operator at the packaging station operating a single foot pedal switch 15.

As shown in FIG. 8, each of the three control units F1, F2, F3 includes electrical connectors or receptacles 251, 252. Each of these receptacles includes eight terminals numbered 1 through 8. Power is supplied to the units F1–F3 by way of lines L1, L2 connected across the terminals 1, 5 of the receptacle 251 in the unit F1.

Terminals of the receptacles 251, 252 having common reference characters are internally wired together in a manner which is described presently and the receptacles 252 of the units F1, F2, respectively, are connected to receptacles 251 of the units F2, F3, respectively, by six wire cables 255, 256.

The interconnection of the units F1–F3 in the manner described enables the three units to independently control their respective feeder and accumulator units yet provides for cooperation between these units to insure highly reliable kit packaging of articles.

Referring now specifically to the feeder unit F1, the power lines L1, L2 are connected to the power terminals 1, 5, respectively. The terminals 1, 2 of the receptacle 251 are connected together through the foot switch 15 so that when the foot switch 15 is closed a circuit is established from the line L1 through the terminal 1, the foot switch 15 and to the terminal 2.

The terminals numbered 2 are all connected in a series circuit which is traced from the terminal 2 of the receptacle 251 (unit F1) through a junction 257a, the terminal 2 of the receptacle 252 (unit F1), a conductor in the cable 255, the terminal 2 in the receptacle 251 (unit F2), a junction 257b, the terminal 2 of the receptacle 252 (unit F2), a conductor in the cable 256, and the terminals 2 of the unit F3 through a junction 257c.

Referring again to the unit F1, the terminal 5 in the receptacle 251 is connected to the power line L2 and to the terminal 6 of the receptacle 251. The terminal 6 is internally connected to the terminal 6 of the receptacle 252 in the unit F1 through junctions 260a, 261a. The relay R4 (unit F1) is connected between the junctions 257a, 260a in the unit F1. Hence when the foot switch 15 is closed, the relay R4 is energized by way of an energizing circuit established between the terminals 2 and 6 through the junctions 257a, 260a, and the relay R4.

It is apparent from FIG. 8 that the terminals 6 in each receptacle of each control unit are all connected in a series circuit through the cables 255, 256 and internal wiring in each of the respective control units. This series circuit is substantially like the series circuit connecting the terminals 2 and hence, for brevity, is not described. Suffice it to say that the relays R4 of the units F1, F2, F3 are connected in parallel with each other and across the series circuit through the terminals 2 and 6.

When the foot switch 15 is closed, the parallel relays R4 in each of the units F1, F2, F3 are all energized and each of the units F1, F2, F3 functions as described above in reference to FIG. 3 when the relay R4 in that unit is energized.

The terminals 4 in each receptacle 251, 252 in each of the units F1–F3 are connected together through the feed switches S2 of their respective control unit. The terminal 4 in the receptacle 251 of the control unit F1 is internally connected to the power line L1 at the terminal 1. The terminals 4 are all connected in series circuit and the switches S2 of each unit F1, F2, F3 are likewise connected in this series circuit between the terminals 4 in the respective unit.

The terminal 4 of the receptacle 252 in the control unit F3 is internally wired to the terminal 8 of that receptacle. The terminals 8 in the receptacles 251, 252 of each of the control units F1–F3 are connected together through junctions 265a, 265b, 265c. The terminal 8 in the receptacle 251 of the unit F3 is connected in the series circuit with the remaining terminals 8 of the units F1, F2 through conductors in the cables 256, 255 and internal wiring of the individual units.

The feed relay R1 of each control unit is connected between the junctions 265, 261 and accordingly, when all of the switches S2 are closed a series circuit through these switches is completed. Each of the relays R1 is energized from the power line L1 through the switches S2, the junctions 265, and 261 associated with each relay and to the power line L2 through one or more of the terminals 6. It is to be understood that during a succeeding half-cycle of the power supply, the current in the described energizing circuitry is reversed and the circuit is completed in reverse manner from that described.

If any one of the switches S2 is opened, the energizing circuit for each of the relays R1 is interrupted. Accordingly, none of the feeder units A1, A2, A3 is capable of feeding articles due to opening of relay contacts R1a of the relay R1 (see FIG. 3). Hence, the operator can terminate operation of all of the feeders simply by opening any one of the feed switches S2 associated with the control units F1, F2, F3.

The sealer unit 12 is connected across the terminals 3 and 7 in the receptacle 252 of the control unit F3. As described previously, the unit 12 has its own power supply. In the system 200, the circuits 174 of each of the units F1, F2 and F3 are connected in series with each other and with the timer motor 81 of the sealer unit 12. This series circuit is traced from the conductor M of the sealer unit through the circuit 174 and terminals 3 in the unit F3, a conductor in the cable 256, the circuit 174 and terminals 3 in the unit F2, a conductor in the cable 255, and the circuit 174 and terminals 3 in the unit F1.

The terminal 3 in the receptacle 251 of the unit F1 is wired to the terminal 7 of that receptacle and the terminals 7 of each unit are connected in a series circuit to the conductor N of the sealer unit.

Normally, when the system 200 is operating, the "mode" switch S4 (FIG. 3) is opened to that the relay contacts R7c control conduction across the circuit 174 (along with the relay contacts R4b). As previously noted, the relay contacts R7b when an accumulator is dumped and remain closed so long as the foot pedal switch 15 remains closed by the operator.

In the system 200, the relay contacts R7b in each control unit are connected in a series circuits with the relay contacts R7b in the other control units so that the sealer unit 12 and conveyor 201 are not operated until all of the accumulators B1–B3 are dumped. This operation of the system insures against premature indexing of the buckets 215 in the conveyor which might otherwise produce errors in the numbers of parts packaged in the kits. This is particularly true where one of the feeder units feeds a substantially larger number of parts than the other feeders.

It can now be seen that a new and improved apparatus has been provided and that the objects heretofore enumerated and others have been accomplished. While preferred embodiments of the invention have been illustrated and described in detail, the invention is not to be considered limited to the precise construction shown.

What is claimed is:

1. In an apparatus for feeding, counting and dispensing articles for packaging:
   a. an electrically operated feeder unit for feeding articles;
   an accumulator unit for accumulating articles fed by the feeder unit, said accumulator unit including a dispenser actuator for dispensing accumulated articles from said accumulator;
   c. a counter unit operated in response to articles fed into said accumulator, said counter unit including counter output circuit means operating at least a first element to terminate operation of said feeder unit when a predetermined number of articles is fed, and operating at least a second element to a condition for enabling operation of said actuator;
   d. manually energized circuit means including an element operated to a condition for enabling operation of said dispenser actuator;
   e. said dispenser actuator connected to and operated only when said second element of said counter output circuit means and said element of said manually energized circuit means are in said conditions for enabling operation of said dispenser actuator; and,
   f. antirepeat circuit means for disabling said dispenser actuator subsequent to dispensing articles so long as said element of said manually energized circuit is maintained in aid condition.

2. Apparatus as claimed in claim 1 wherein said dispenser actuator is operated between a dispensing condition and an accumulating condition and further including timer circuitry for maintaining said actuator in its dispensing condition for a predetermined period, said timer circuitry effective to condition said antirepeat circuit means to disable said dispenser actuator at the end of said period 3. Apparatus as claimed in claim 2 wherein said timer circuitry is further operative to condition said counter unit for initiating operation of said feeder unit at the end of said period.

4. Apparatus as claimed in claim 1 and further including a packaging station for dispensed articles, said packaging station including sealing structure for sealing dispensed articles in containers therefor, said antirepeat circuit means effective to operate electrical contacts to enable operation of said sealing structure when articles have been dispensed to said packaging station.

5. Apparatus as claimed in claim 1 wherein said feeder unit comprises first and second articles feeders, one of said feeders operative to feed articles to the other of said feeders, and further including circuitry for controlling the feeding speed of articles in said feeders comprising a first circuit element for adjustably governing the electrical power supplied to said feeders and a second circuit element connected in series with said first circuit element and said one of feeders for adjustably reducing the power supplied to said one of said feeders with respect to said other feeder whereby articles fed to said other feeder are accelerated thereby.

6. Apparatus as claimed in claim 5 and further including circuitry connectable with said first circuit element for reducing the power supplied to said feeders and thereby reducing the feeding rate of articles, and at least a switch for connecting said circuitry to said first circuit element, said switch operated by said counter unit in response to feeding of a number of articles less than said predetermined number.

7. Apparatus as claimed in claim 1 and further including malfunction isolating switch means operable to a position for connecting said counter unit across an electrical power supply for operation independently of the remaining circuitry whereby malfunctioning of said counter unit is verifiable.